UNITED STATES PATENT OFFICE.

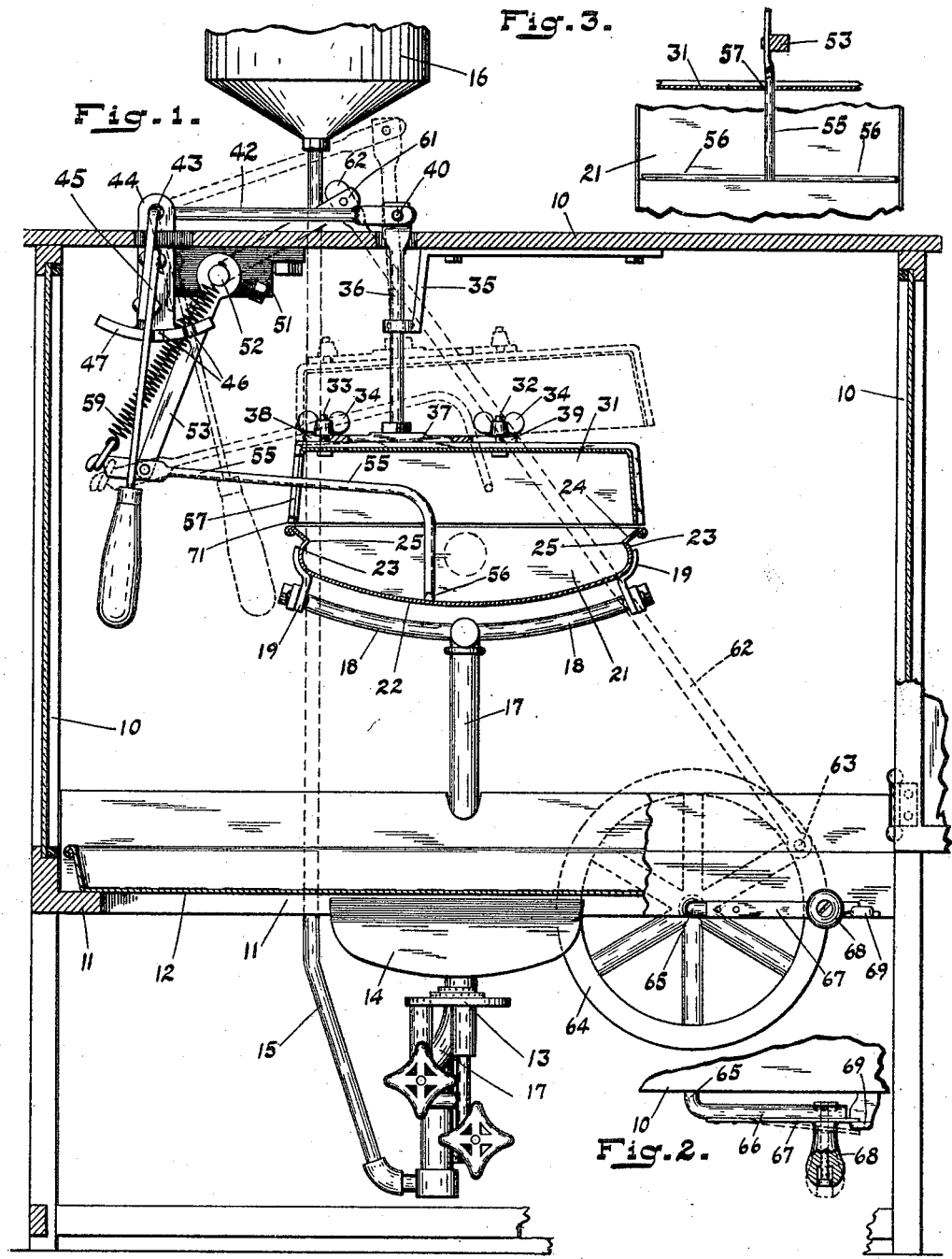

JOHN W. EALEY, OF MARTINSVILLE, INDIANA.

CORN-POPPER.

998,681. Specification of Letters Patent. Patented July 25, 1911.

Application filed June 20, 1910. Serial No. 568,022.

*To all whom it may concern:*

Be it known that I, JOHN W. EALEY, a citizen of the United States, residing at Martinsville, in the county of Morgan and State of Indiana, have invented a new and useful Corn-Popper, of which the following is a specification.

The object of my invention is to produce a mechanism by means of which pop corn may be quickly and uniformly popped, the device being of such character that the corn is thoroughly shifted and turned during the heating process.

The accompanying drawings illustrate my invention.

Figure 1 is a vertical section of an apparatus embodying my invention, the popping mechanism being considerably exaggerated in size relative to the inclosing casing; Fig. 2 a fragmentary detail of the crank catch and Fig. 3 a fragmentary plan of a desirable form of stirrer.

In the drawings, 10 indicates a suitable inclosing casing having an open bottom surrounded by a flange 11 which serves to support a readily removable catch pan 12. Below the catch pan 12 is a burner and gas generator 13 and a guard 14 is placed between this burner and the pan 12 so as to distribute the heat in such manner that the contents of the pan 12 will not be scorched. The burner and generator 13 is supplied with fuel through a pipe 15 leading from a supply tank 16. Leading from the generating portion of the burner 13 is a gas pipe 17 which leads up into casing 10 and is provided with a plurality of perforated laterals 18 which are curved upwardly at their opposite outer ends and provided with suitable supporting brackets 19, 19. The brackets 19 are formed to receive the popper pan 21 and the perforated laterals 18 form burners through which the generated gas from the generator may be projected. The bottom 22 of pan 21 is curved to substantially conform with the curvature of the laterals 18 and at each end the bottom is curved upwardly and backwardly as clearly indicated at 23, and then flared sharply outwardly and upwardly as indicated at 24 so as to thus provide an inwardly projecting corner or edge 25 below the open top of the pan.

Arranged above the open top of the popper pan 21 is an inverted basin-like cover 31 the open lower end of which fits down over the upper open end of the popper pan. Cover 31 is provided with a pair of threaded upwardly projecting pins 32 and 33 each of which is adapted to receive a thumb nut 34.

Secured to the under side of the top of casing 10 is a hanger 35 in which is mounted a vertically reciprocable rod 36 the lower end of which carries a horizontal cross arm 37 having open ended slots 38 and 39 at opposite ends. The slots 38 and 39 are adapted to receive the pins 32 and 33 respectively and the slot 39 is long enough to permit the cover 31 to be shifted to the left far enough to withdraw pin 33 from slot 38, whereupon the left-hand end of the pan may be swung slightly to one side so as to carry the pin 33 beyond the arm 37 and then permit the cover to be shifted to the right in order to withdraw pin 32 from slot 39. By means of this mounting I am able to readily withdraw and replace the cover so that it may be kept clean.

The upper end of rod 36 carries a pin 40 which is pivoted in the end of an arm 42 carried by a rock-shaft 43 journaled in suitable brackets 44 carried by the top of casing 10. Shaft 43 carries an operating lever 45 which may engage any one of a series of notches 46 formed in a retaining segment 47.

Journaled in suitable brackets 51 secured to the under side of the top of casing 10, is a rock shaft 52 provided with an arm 53. Pivoted to the lower end of arm 53 is a rod 55 which is bent downwardly at its free end and carries a stirrer 56 which projects across and lies upon the bottom 22 of the popper pan 21. Rod 55 projects back beyond arm 53 and is connected to one end of a spring 59, the arrangement being such that the spring serves to keep the stirrer 56 down upon the bottom of the popper pan. The rod 55 of stirrer 56 is projected through a suitable slot 57 in one wall of the cover 31, (as shown in Fig. 1).

Secured to the rear end of rock shaft 52 is an arm 61 to which is pivoted one end of a pitman 62 the opposite end being pivoted at 63 to a fly-wheel 64 carried by the rear end of a crank-shaft 65 journaled in the bottom of the casing. Crank-shaft 65 at its forward end is provided with a crank 66 which carries a spring latch 67. Secured to the latch 67 is a handle 68 which is laterally movable with the latch and said latch is adapted to be moved into position to be engaged by a catch 69, as illustrated in Fig. 2.

In operation, the cover 31 will be thrown to the position indicated in dotted lines in Fig. 1, the rod 55 of the stirrer 56 being engaged and lifted by a cross bar 71 which forms part of the cover so that the stirrer is lifted entirely free from the popper pan. The popper pan, which merely rests by its own weight in the brackets 19, may then be placed in position where it will be affected by the flame issuing from the perforations of the laterals 18 of the heater. The cover will then be moved down to the position indicated by full lines in the drawings and the operator, by grasping handle 68 and lifting upwardly slightly, may permit the spring catch 67 to move toward the operator enough to clear catch 69, whereupon shaft 65 may be rotated and the stirrer 56 thereby reciprocated, the stirrer being held constantly in engagement with the bottom of the popper pan by spring 59. As the stirrer 56 reaches the ends of its stroke it will pass to the reversely curved portions 23 of the popper pan and the corn will be propelled into these reversely curved portions and thus be entirely turned over before it will drop back upon the bottom of the popper pan. The stirrer, as it traverses the bottom of the popper pan, agitates the corn to a considerable extent but I find in practice that this agitation does not insure a proper turning of the kernels except the kernels be driven continually to the end of the pan and turned positively by the action of the stirrer in conjunction with the reversely curved portions 23 of the pan bottom. When the kernels of corn have been heated enough to cause the popping action to begin, the popper pan and the cover 31 become filled with popped kernels and therefore, in order to make room for the subsequently popping kernels, the lever 45 is shifted to an intermediate position so as to move the cover 31 upwardly a short distance so as to provide an outlet for the surplus popped kernels between the open bottom of the cover and the open top of the popper pan, the stirrer 56 remaining upon the bottom of the popper pan. When the popping action has ceased the cover 35 is thrown to its upper position and the popper pan removed by hand, it being understood that said pan is provided with a suitable handle.

In order to permit the movement of cover 31 to its upper position, I find it desirable that the stirrer 56 be at an intermediate position and it is for this reason that I provide the catch 69 and latch 67. It will be readily understood that the stirrer 56 may be given a considerable variety of forms without departing from my invention.

I claim as my invention:

1. In a corn-popper, the combination with an inclosing casing, of a burner mounted in the upper part of said casing, a popper pan support arranged adjacent said burner, a popper pan upon said support above the burner, a catch pan arranged in the casing below said burner in position to receive the popped corn falling from the popper pan, a burner arranged below said catch pan, a deflecting guard arranged between said last mentioned burner and the catch pan, a generator connected with said two burners, and a fuel tank connected with said generator, all combined substantially as and for the purpose set forth.

2. In a corn-popper, the combination with an inclosing casing, of a burner mounted in the upper part of said casing, a popper pan support arranged adjacent said burner, a popper pan upon said support above the burner, a catch pan arranged in the casing below said burner in position to receive the popped corn falling from the popper pan, the burner arranged below said catch pan, a generator connected with said two burners, and a fuel tank connected with said generator, all combined substantially as and for the purpose set forth.

3. In a corn-popper, the combination of an open-top popper pan, a heater arranged below said pan, an open-bottom cover for the popper pan, a support for said cover, means for adjusting said support vertically, a stirrer projected into the cover and popper pan, a rock-shaft, connections between said rock-shaft and the stirrer, a crank-shaft, a connection between said crank-shaft and the rock-shaft, a spring supported handle carried by the crank of said crank-shaft and provided with a projection, and a catch member arranged in position to receive said projection to definitely position the stirrer and retain the same in that position.

4. In a corn-popper, a popper pan comprising a downwardly cupped bottom having its ends upwardly and inwardly curved, a stirrer adapted to traverse the bottom of the popper pan to the curved ends thereof, means for reciprocating the stirrer across the popper pan bottom, a cover for said popper pan, and connections between said cover and stirrer whereby vertical movement of the cover will withdraw the stirrer from the popper pan.

5. In a corn-popper, the combination of an open-top popper pan, a heater arranged below said pan, an open-bottom cover for the popper pan, a support for said cover, a guide for the cover permitting vertical movement thereof, a rock shaft, an arm carried by the rock shaft and connected with said cover, a lever also connected with the rock shaft, and means for holding said lever in several positions of adjustment whereby the cover may be maintained closely over the popper pan, a short distance above the popper pan to permit exit of surplus popped corn, or sufficiently above the popper pan to permit withdrawal thereof from the burner.

6. In a corn-popper, the combination of an open-top popper pan, a heater arranged below said pan, an open-bottom cover for the popper pan, a support for said cover, means for adjusting said support vertically, a stirrer projected into the cover and popper pan, and means by which said stirrer may be reciprocated, and connections between the stirrer and cover whereby vertical movement of the cover relative to the popper pan will withdraw the stirrer from said pan.

7. In a corn-popper, the combination of an open-top popper pan, a heater arranged below said pan, an open-bottom cover for the popper pan, a support for said cover, means for adjusting said support vertically, a stirrer projected into the cover and popper pan, a rock-shaft, connections between said rock-shaft and the stirrer, a crank-shaft, and a connection between said crank-shaft and the rock-shaft.

In witness whereof, I have hereunto set my hand and seal at Indianapolis, Indiana, this 7th day of June, A. D. one thousand nine hundred and ten.

JOHN W. EALEY. [L. S.]

Witnesses:
ARTHUR M. HOOD,
THOMAS W. MCMEANS.

Copies of this patent may be obtained for five cents each, by addressing the "Commissioner of Patents, Washington, D. C."